Jan. 11, 1955  S. OVSHINSKY  2,699,083
MACHINE TOOL
Original Filed Oct. 4, 1948  4 Sheets-Sheet 2
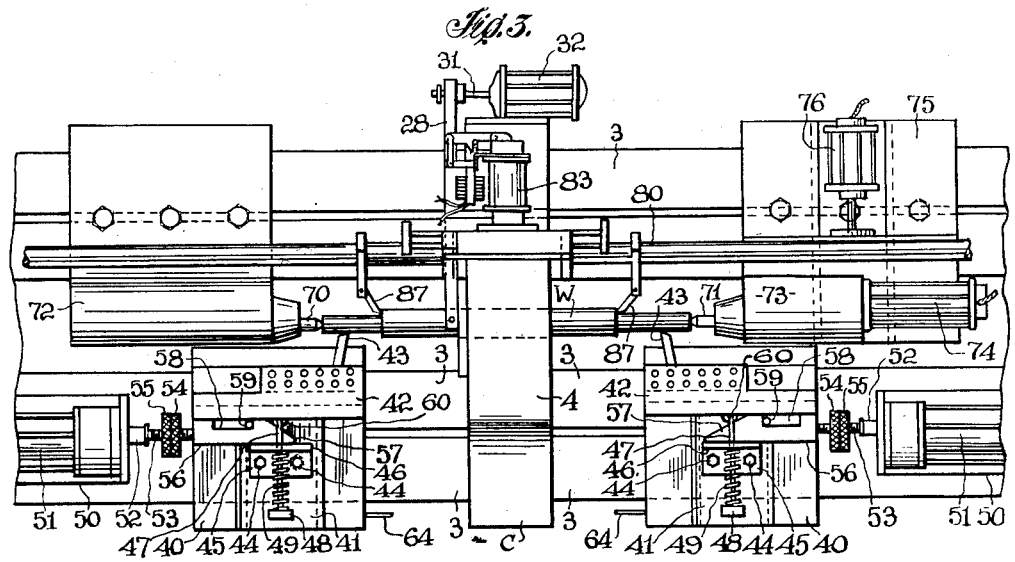
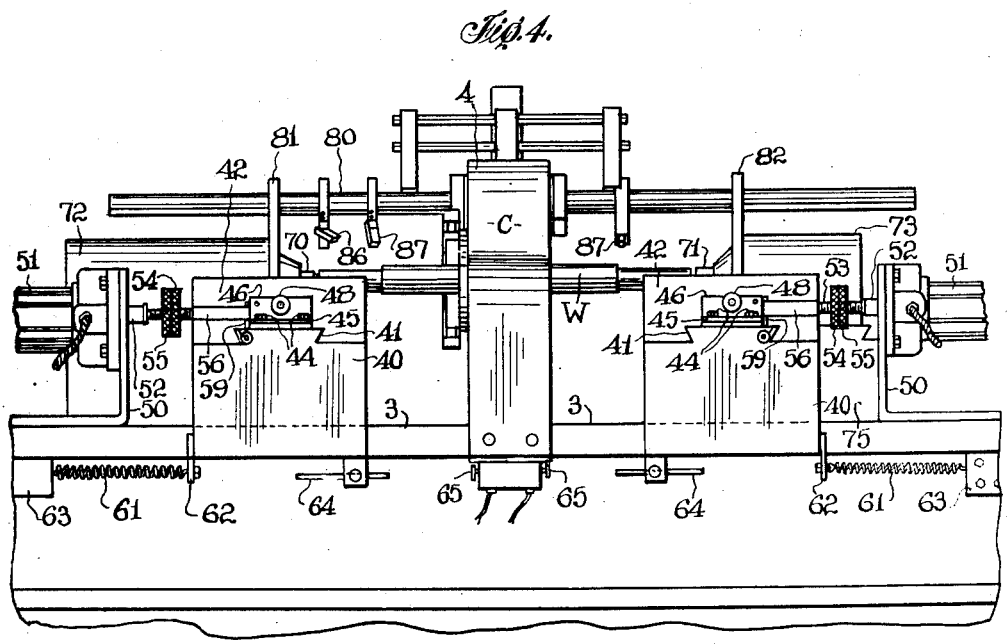
INVENTOR.
Stanford Ovshinsky
BY
*Frease and Bishop*
ATTORNEY

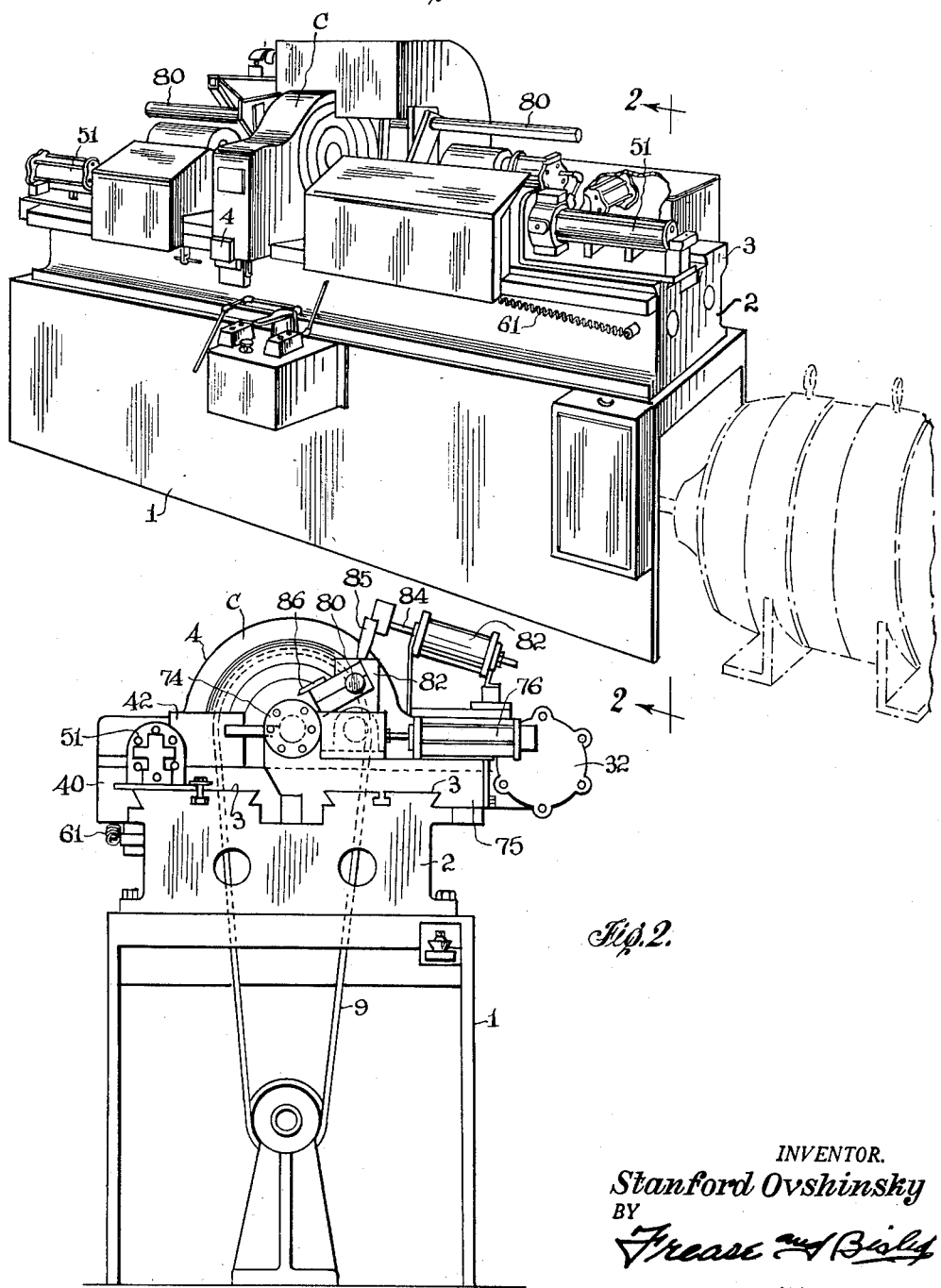

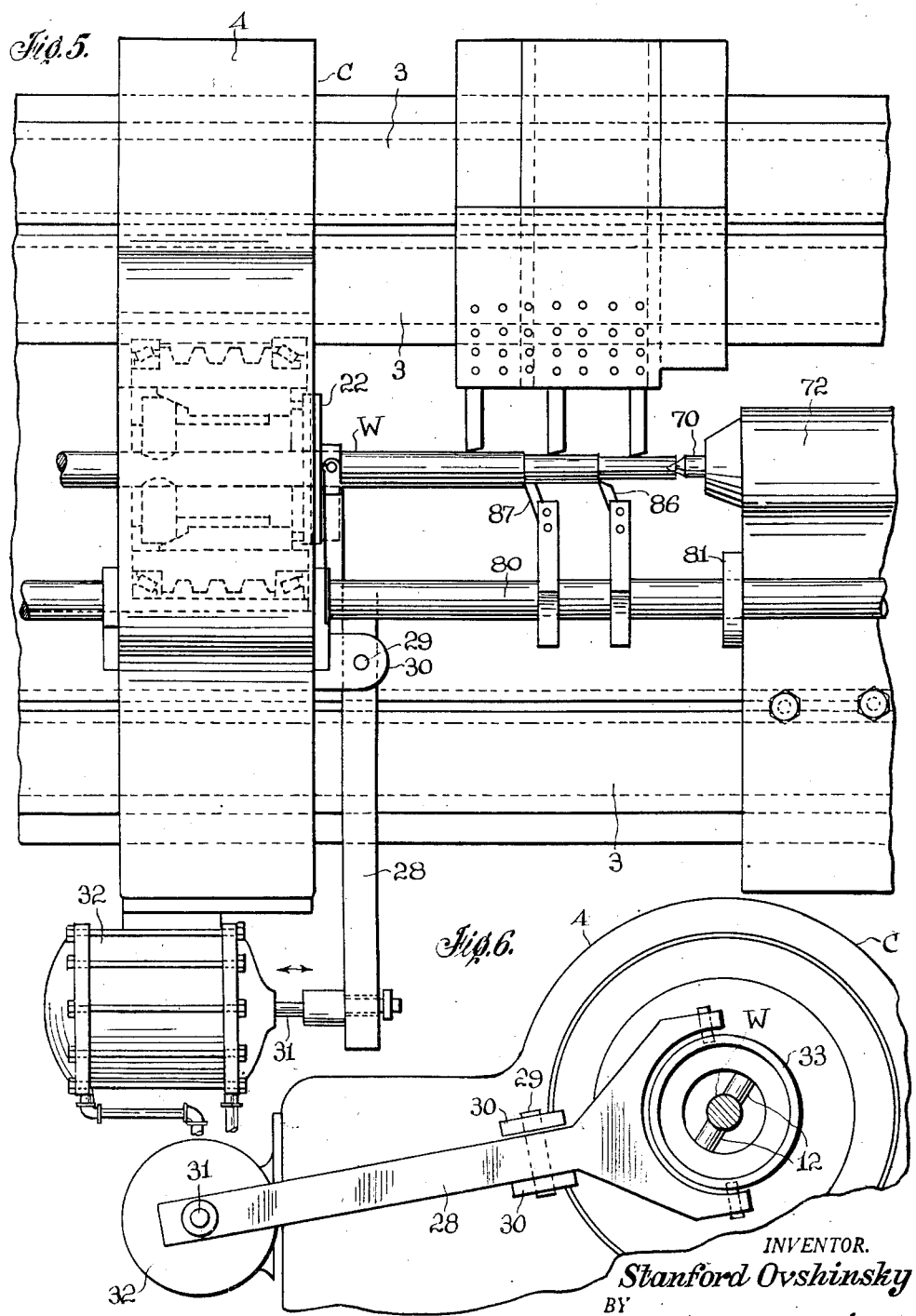

Jan. 11, 1955  S. OVSHINSKY  2,699,083
MACHINE TOOL
Original Filed Oct. 4, 1948  4 Sheets-Sheet 4
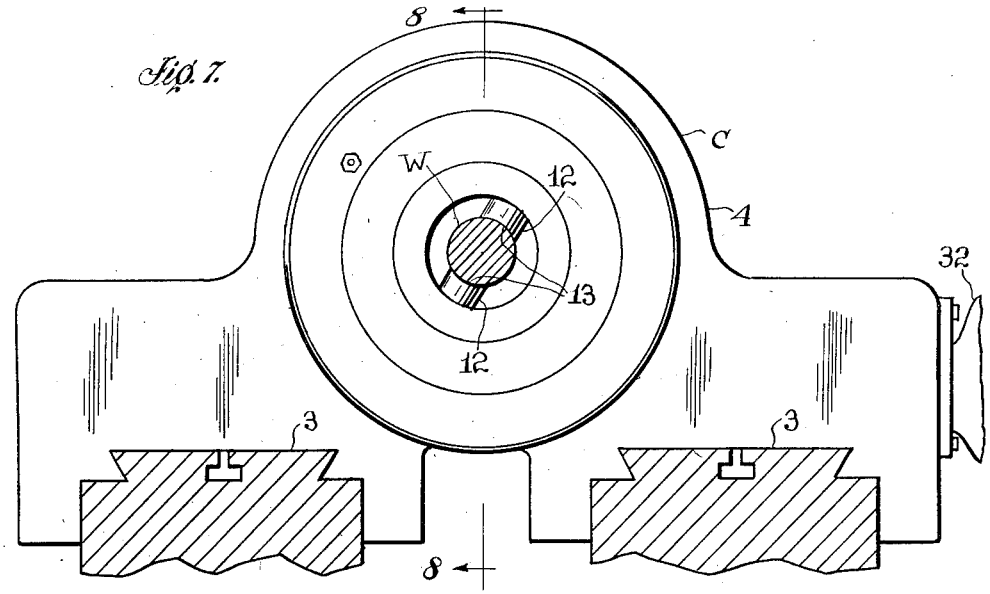
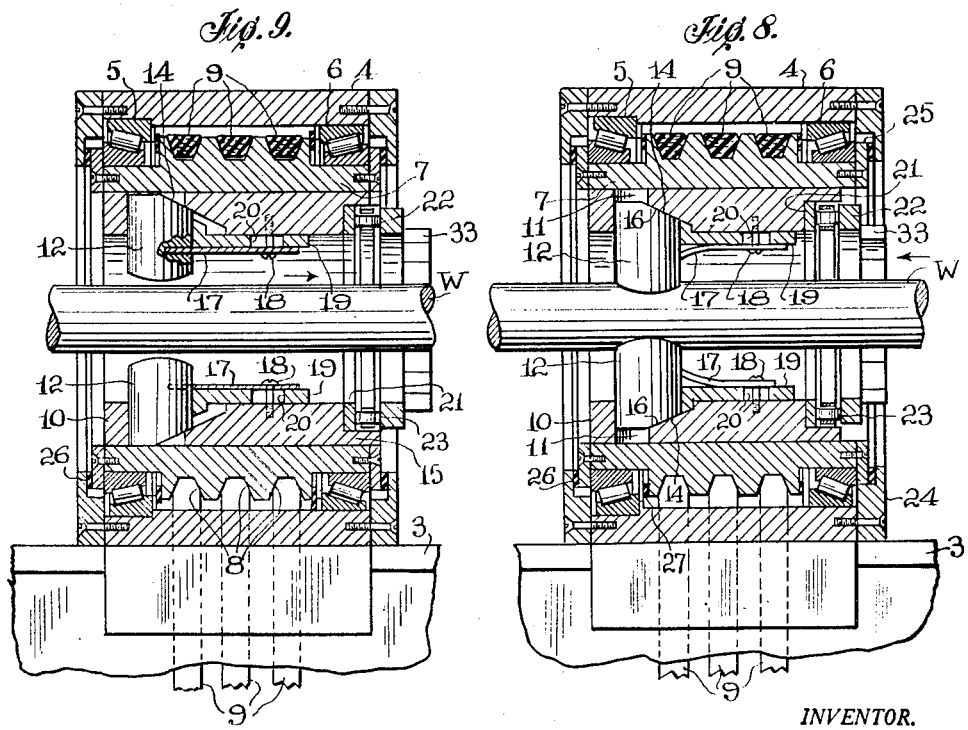
INVENTOR.
Stanford Ovshinsky
BY
ATTORNEY

United States Patent Office 2,699,083
Patented Jan. 11, 1955

2,699,083

MACHINE TOOL

Stanford Ovshinsky, Akron, Ohio, assignor to The Stanford-Roberts Manufacturing Company, Akron, Ohio, a corporation of Ohio Original application October 4, 1948, Serial No. 52,719. Divided and this application February 4, 1950, Serial No. 142,420

3 Claims. (Cl. 82—21)

This invention relates, as indicated, to machine tools, but has reference more particularly to a machine tool of the center-drive lathe type, and this application is a division of my application, Serial No. 52,719, filed October 4, 1948.

A primary object of the invention is to provide a machine tool of the character described, which is of such massiveness, rigidity and general construction that work can be machined therein at extremely high speeds with carbide tools and the like without chattering or vibration of the work or tools.

Another object of the invention is to provide a machine tool of the character described, having a center drive of unique and novel construction enabling workpieces clamped therein to be machined at both ends simultaneously, the machine operations at each end being accomplished wihout affecting the machining operations at the other end.

Another object of the invention is to provide a machine tool of the character described in which stresses imposed upon the machine tool even at maximum speeds of the center drive are easily and completely absorbed.

A further object of the invention is to provide a machine tool of hte character described, in which there is a total absence of "leverage" or "wiggle" which is characteristic of so-called single end machines, so that work machined therein is devoid of deep feed marks and other defects common in the machining of shafts and the like.

A further object of the invention is to provide a machine tool of the character described, in which no slippage of the workpiece in the center drive can occur, even at speeds and feeds which were heretofore considered unattainable.

A further object of the invention is to provide a machine tool of the character described, in which the chucking operation is completely automatic and is effected through air, hydraulic or mechanical pressure.

A further object of the invention is to provide a machine tool of the character described, in which the center drive is of such construction that substantially the entire workpiece, including the major portion thereof within the center drive, is accessible for machining operations.

A still further object of the invention is to provide a machine tool of the character described, having novel tool feed means incorporated therein, as well as novel means for effecting auxiliary machining operations.

Other objects and advantages of the invention will be apparent during the course of the following description.

In the accompanying drawings, forming a part of this specification, and in which like numerals are employed to designate like parts throughout the same, Fig. 1 is a perspective view of a machine tool embodying the invention;

Fig. 2 is an end elevational view of the machine tool, as viewed from the right end of Fig. 1, as indicated by the arrows 2—2 of Fig. 1;

Fig. 3 is a fragmentary top plan view of the machine tool;

Fig. 4 is a fragmentary front elevational view of the machine tool;

Fig. 5 is a fragmentary top plan view, on an enlarged scale, showing the use of the overhead bar;

Fig. 6 is a fragmentary side elevational view of the yoke lever for actuating the chuck jaws;

Fig. 7 is a side elevational view of the chuck or center drive, as viewed from the side opposite that shown in Fig. 6;

Fig. 8 is a fragmentary cross-sectional view, taken on the line 8—8 of Fig. 7, with the jaws in operative or clamped position on a workpiece, and Fig. 9 is a view similar to Fig. 8, but with the chuck jaws in inoperative or retracted position.

Referring more particularly to the drawings, the machine tool will be seen to comprise support 1, to which a bed 2 is bolted, the bed having V-shaped ways 3 in its upper portion, providing slideways for the operative elements of the machine tool.

Mounted on the ways 3, centrally of the bed 2, is a chuck, which is generally designated by the letter C. The chuck C comprises a housing 4, which is secured to the ways 3 in the manner clearly shown in Fig. 7, and is provided with tapered roller bearings 5 and 6, which are pressed into the ends of the housing. An annular sleeve 7 is pressed into the inner races of the bearings 5 and 6, and is provided in its exterior surface with annular grooves 8 for the reception of V-belts 9 for driving the sleeve 7, these belts being motor-driven from a point below the chuck and within the support 1, as shown in Fig. 2.

Rigidly secured within one end of the sleeve 7 is a jaw guide 10, having radial slideways 11 for jaws 12, provided with arcuate gripping faces 13 at their radially-innermost ends, and with beveled surfaces 14 at their radially-outermost ends. Disposed within the other end of the sleeve 7 for reciprocal longitudinal movement relatively to the jaw guide 10 is a jaw operating shoe 15, which is restrained against circumferential movement relatively to the guide 10 by means of a tongue and groove connection (not shown) between the guide 10 and shoe 15.

The shoe 15 is provided at one end with tapered faces 16, the angle of which corresponds to the taper of the beveled ends 14 of the jaws. These faces 16 bear against the ends 14 of the jaws. The jaws 12 have leaf springs 17 extending laterally therefrom, which springs are secured to the shoe 15 by means of screws 18. These springs normally bear against jaw guide shoes 19, which are slidable relatively to the jaw operating shoe 15, and are provided with elongated slots 20 through which the screws 18 extend. The function of the springs 17 and shoes 19 will be presently explained.

Disposed adjacent one end of the shoe 15 is a pair of annular plates 21 and 22, between which a thrust bearing 23 is interposed. Retainer plates 24 and 25 are secured to the ends of the housing 4 and sleeve 7 respectively, these plates permitting adjustment of the bearings 5. Lubrication seals 26 and 27 are also provided.

Actuation of the shoe 15 for the purpose of moving the jaws 12 to operative position, is effected by a yoke lever 28 (Figs. 5 and 6), which is mounted for pivotal movement about a pin 29 mounted in ears or lugs 30 extending from the chuck housing 4. The lever 28 is rocked about the pin 29 by means of a piston 31 of a hydraulic cylinder 32, the piston 31 and cylinder 32 constituting parts of a usual double-acting fluid pressure operated reciprocating motor. The yoke end of the lever 28 is pivoted to a collar 33, which is rigidly secured to the plate 22.

The inoperative or retracted position of the jaws 12 is shown in Fig. 9. The jaws are maintained in this position by the springs 17, and by the fact that the jaw operating shoe 15 is at its extreme right position relatively to the sleeve 10.

Upon actuation of the collar 33 to the left, as indicated by the arrow in Fig. 8, which movement is effected by the yoke lever 28, the shoe 15 is moved to its extreme left position, as shown in Fig. 8, causing the tapered surfaces 16 of the shoe to bear against the beveled surfaces 14 of the jaws, forcing the jaws 12 radially-inwardly and into clamping or gripping engagement with the workpiece W which is to be turned. This motion of the jaws 12 is perpendicular to the direction of movement of the shoe 15, and is in opposition to the tension of the springs 17, which are bowed in the manner shown in Fig. 8. The clamping pressure of the jaws 12 on the workpiece W is constant, depending upon the pressure of the fluid in the hydraulic cylinder 32.

In opening the jaws 12, the collar 33 is moved to the right, as indicated by the arrow in Fig. 9, permitting the springs 17 to retract the jaws 12, the movement of the jaws forcing the shoe 15 to the right by reason of the action of the beveled surfaces 14 of the jaws on the tapered surfaces 16 of the shoe 15.

After the workpiece W has been clamped by the jaws 12, it may be rotated for machining operations thereon, through the intermediary of the belt drive which has been described.

Mounted for longitudinal movement along the slideways 3, at each side of the chuck, as best shown in Figs. 3 and 4, is a tool saddle 40, provided at its upper end with a V-shaped slideway 41 for a tool slide 42, which is movable transversely of the direction of movement of the saddle 40. A cutting tool or bit, secured to the tool slide 42, is indicated by reference numeral 43.

Secured, as by bolts 44, to the saddle 40, is an angle plate or bracket 45 having an upstanding flange 46, through which a rod 47 extends and is movable. The rod 47 is rigidly secured at its forward end to the tool slide 42, and is provided at its rear end with a stop collar 48. A compression coil spring 49 is mounted on the rod 47, being interposed between the rear face of the flange 46 and the stop collar 49.

Mounted on the bed of the machine adjacent each of the tool saddles 40 is a bracket 50, which supports a double-acting fluid pressure operated reciprocating motor including a hydraulic cylinder 51, in which is reciprocably mounted in a usual manner, a piston having a piston rod 52 and the piston rod 52 of which has a threaded portion 53, which carries a pair of knurled collars 54 and 55 in threaded engagement therewith. The collar 54 functions as a feed depth adjustment stop which is adapted for abutment with the tool saddle 40, and the collar 55 functions as a lock-nut for locking the collar 54 in preselected adjusted position.

Rigidly secured by a connection to the end of the threaded portion 53 of the piston rod 52 is a cam bar 56 provided with a cam surface 57 and a slot 58. A pin 59 projects upwardly from the tool saddle 40 into the slot 58. The cam surface 57 is adapted for coaction with a roller or cam follower 60 which is mounted at the rear of the tool slide 42. A tension coil spring 61 is interposed between and connected to a plate 62 depending from the saddle 40 and a plate 63 mounted on the bed of the machine, and serves a function to be now described.

The operation of the above-described tool feed will now be briefly described, with reference to the tool feed shown at the left side of Figs. 3 and 4.

As the piston rod 52 is moved to the right, as viewed in Figs. 3 and 4, the surface 57 of the cam bar 56 engages the roller 60 on the tool slide 42 and causes the tool slide to be fed inwardly towards the workpiece W, this movement continuing until the collar 54 comes into abutment with the tool saddle 40, the position of which on the extension 53 thus controls the depth of cut of the tool 43. During this movement of the tool slide, the tool saddle is prevented from moving longitudinally along the slideway 3 of the machine by reason of the tension of the spring 61 which overcomes any tendency of the cam bar 56 to cause such longitudinal movement of the tool saddle. At the same time, the coil spring 49 is compressed between the flange 46 and collar 49 as a result of the inward movement of the tool slide.

After the collar 54 abuts the tool saddle 40, the entire tool saddle is moved by the piston rod 52 to the right, longitudinally along the slideway 3, causing the tool 43 to take a longitudinal cut along the workpiece W. If a depth or plunge cut is not desired, means (not shown) may be provided for locking the tool slide 42 to the tool saddle 40, so as to render ineffective the action of the cam bar 56 on the roller 60.

The length of the aforesaid longitudinal cut is controlled by the engagement of an adjustable stop rod 64 on the tool saddle with a micro-switch 65 on the machine tool, which functions through a solenoid-operated valve (not shown) to reverse the direction of movement of the piston rod 52. This reversal of the direction of movement of the piston rod 52 causes the tool slide to be retracted from the workpiece W instantaneously, as a result of the tendency of the spring 49 to assume its original uncompressed condition, the surface 57 of the cam bar having already been instantaneously retracted to permit this retraction of the tool slide. Then, after the right end of the slot 58 in the cam bar comes into engagement with the pin 59, the tool saddle is moved back to its original position by the continued movement of the piston rod 52 to the left.

The hydraulic pressure within the cylinder 51, acting constantly on the tool slide 42 through the cam bar 56, is such that the tool slide cannot move rearwardly away from the workpiece during either the depth or longitudinal cut, because the force acting on the tool slide is always greater than the force produced by the cutting action of the tool. As a result, there is no tendency or possibility of the tool gouging the workpiece, as in conventional machining practice, especially where a shaft is machined to form a shoulder. This anti-gouging action is a unique feature of the machine tool.

Referring again to Figs. 3 and 4 of the drawings, it will be seen that the workpiece W has its ends mounted on live centers 70 and 71. The center 70 is mounted on a head stock 72, the position of which, longitudinally of the machine, may be adjusted, but which remains stationary after adjustment. The center 71 is mounted on a tail stock 73, constant pressure on the centers 70 and 71 and consequently on the workpiece, by a double-acting fluid pressure operated reciprocating motor including a piston disposed within a hydraulic cylinder 74, which piston exerts pressure on the center 71. The tail stock 73 is mounted in such a manner that it can be moved transversely of the bed 3, along a support 75, by means of a double-acting fluid pressure operated reciprocating motor including a piston in a hydraulic cylinder 76, for purposes of loading and unloading workpieces in the machine.

The transversely movable tail stock 73 is included in the subject matter and claims of my co-pending application for U. S. Letters Patent for Machine Tool, Serial No. 750,391, filed May 26, 1947.

The support 75 is also movable longitudinally of the slideway 3 for the purpose of adjusting the position thereof longitudinally of the machine.

The machine tool further includes an overhead bar 80, mounted in bearings 81 and 82, and adapted to be rocked in these bearings between an operative and inoperative position. This bar is rocked between said positions by a double-acting fluid pressure operated reciprocating motor including a hydraulic cylinder 83, through piston 84 of the motor and levers 85. The bar has clamped thereto at preselected points various tools for chamfering and undercutting, which are represented more or less diagrammatically by reference numerals 86 and 87 respectively. These tools may be rocked or moved into operative position by the cylinder 83, after the tool slides 42 have been retracted at the conclusion of the turning operations. The use of such an overhead bar and tools is highly advantageous in that it obviates the need for removing or replacing the tools from the slides 42 for operations such as chamfering, undercutting, etc., and thereby increases the speed of all machining operations in production work.

The machine tool, as thus described, is characterized by the following advantages, among others:

(a) The V-shaped slideways on the bed of the machine enable the tool slides to be used at the rear of the machine as well as the front, and is superior in construction to conventional slideways of inverted V-shape.

(b) The massiveness, rigidity and general construction of the machine are such that the machine can easily absorb stresses imposed upon it by the full power transmitted by the chuck. This is particularly noticeable in machining with carbide tools.

(c) The construction of the chuck is such that it makes the center drive not only a self-centering and a work clamping unit, but also a driving unit as well, and also, sets up a dampening effect, so that no vibrations are transmitted from one end of the chuck to the other. This creates a freedom from chatter, which enables machining operations on a workpiece at one side of the chuck to be accomplished without affecting machining operations on the same workpiece at the other side of the chuck.

(d) By supporting the workpiece at three points, i. e., by the centers and the chuck, there is a complete absence of the "leverage" which is typical of single end machines and which causes deep feed marks during machining operations, due to the wiggle of the workpiece.

(e) The chuck is not driven through a chain of gears (which results in loss of horsepower), but is driven directly by the motor. This increases the mechanical efficiency of the machine.

(f) The air or hydraulic pressure applied from the yoke arm 28 to the sleeve 15 through the thrust bearing 23 allows for no backlash. Since this pressure is regulated, the force is constant and independent of the motive power, and the chucking operation is completely automatic.

(g) No slippage of the workpiece in the chuck can occur. This enables deep cuts to be taken in a workpiece, at high speeds and feeds which were heretofore considered unattainable.

(h) The narrow center drive permits a shaft to be machined to a point near the chuck jaws, there being less than 1½ inch of inaccessible or dead space within the chuck. This is extremely important, in that it permits the machine to be used for many types and varieties of jobs that were heretofore considered impossible.

It will be understood that the machine tool may be modified in many respects without departing from the scope of the invention. For example, while employing tool saddles and slides as shown, turret attachments may be provided at each end of the machine, so that a multiplicity of operations may be performed by the turret tools on each end of the workpiece, independently of the other. Moreover, other types and varieties of chuck jaws may be employed than those shown. The machine, in general, is adapted not only for the machining of shafts, as described, but also for the machining of forgings, ferrous and non-ferrous castings, facing, centering, metal spinning, threading, boring, and various other operations.

I claim:

1. In a machine tool of the character described, a bed, a tool saddle movable longitudinally on said bed, a tool slide movable transversely on said saddle, a cam bar reciprocable longitudinally on said saddle and having a cam surface, a cam follower on said tool slide, means yieldingly engaging said cam follower against said cam surface, fluid-actuated means for reciprocating said cam bar, the fluid-actuated means including a cylinder mounted on said bed, a piston reciprocably mounted in the cylinder and the piston having a piston rod and a connection of the piston rod with said cam bar, said rod having a threaded portion intermediate said connection and said piston provided with a pair of threaded collars, one of which functions to engage said saddle after the full extent of cam movement of the tool slide to move said saddle along said bed, and the other of which functions to lock the first collar in adjusted position along said extension.

2. A machine tool, as defined in claim 1, in which spring means interconnect said saddle and bed and functions to resist longitudinal movement of the saddle until engaged by the first collar.

3. A machine tool, as defined in claim 2, in which said saddle has a pin projecting therefrom, and said cam bar has a slot into which said pin projects, said saddle being movable in one direction by engagement of one end of said slot with said pin.

References Cited in the file of this patent

UNITED STATES PATENTS

| | | |
|---|---|---|
| 627,385 | Brockie | June 20, 1899 |
| 668,863 | Vogel | Feb. 26, 1901 |
| 1,206,528 | Goddu | Nov. 28, 1916 |
| 1,493,212 | Mansfield | May 6, 1924 |
| 1,510,811 | Ward | Oct. 7, 1924 |
| 1,568,641 | Thacher | Jan. 5, 1926 |
| 1,571,323 | Cole et al. | Feb. 2, 1926 |
| 1,825,722 | Forward et al. | Oct. 6, 1931 |
| 2,008,010 | Foster | July 16, 1935 |
| 2,078,697 | Svenson | Apr. 27, 1937 |
| 2,206,886 | Granberg | July 9, 1940 |
| 2,249,241 | Groene | July 15, 1941 |
| 2,338,125 | May | Jan. 4, 1944 |
| 2,540,323 | Cross | Feb. 6, 1951 |

FOREIGN PATENTS

| | | |
|---|---|---|
| 113,943 | Australia | Oct. 9, 1941 |